US008717234B2

(12) United States Patent
Lainé

(10) Patent No.: US 8,717,234 B2
(45) Date of Patent: May 6, 2014

(54) SYSTEM FOR MONITORING A SATELLITE CONSTELLATION OF A POSITIONING SYSTEM

(75) Inventor: Robert André Lainé, Paris (FR)

(73) Assignee: Astrium SAS, Paris (FR)

( * ) Notice: Subject to any disclaimer, the term of this patent is extended or adjusted under 35 U.S.C. 154(b) by 360 days.

(21) Appl. No.: 13/126,946

(22) PCT Filed: Nov. 2, 2009

(86) PCT No.: PCT/FR2009/052107
§ 371 (c)(1),
(2), (4) Date: Apr. 29, 2011

(87) PCT Pub. No.: WO2010/052414
PCT Pub. Date: May 14, 2010

(65) Prior Publication Data
US 2011/0210890 A1    Sep. 1, 2011

(30) Foreign Application Priority Data

Nov. 5, 2008  (FR) ..................... 08 06162

(51) Int. Cl.
*G01S 19/02*  (2010.01)
*G01S 19/08*  (2010.01)
*G01S 19/20*  (2010.01)

(52) U.S. Cl.
USPC ........... 342/357.395; 342/357.45; 342/357.58

(58) Field of Classification Search
CPC .......... G01S 19/02; G01S 19/08; G01S 19/20

USPC ......................... 342/357.395, 357.45, 357.58
See application file for complete search history.

(56) References Cited

U.S. PATENT DOCUMENTS 6,134,484 A *  10/2000  Geier et al. ................ 701/13
7,511,660 B2 *  3/2009  Damidaux et al. ....... 342/357.45
2004/0193373 A1  9/2004  Beauregard et al.

FOREIGN PATENT DOCUMENTS

EP          1 876 465 A1     1/2008

OTHER PUBLICATIONS

International Search Report completed Feb. 15, 2010 and mailed Feb. 22, 2010 from corresponding International Application No. PCT/FR2009/052107, filed Nov. 2, 2009 (3 pages).
Written Opinion completed Feb. 15, 2010 and mailed Feb. 22, 2010 from corresponding International Application No. PCT/FR2009/052107, filed Nov. 2, 2009 (11 pages).
Enge et al. "Architecture for a Civil Integrity Network Using Inmarsat", ION GPS/GNSS, XP002415357, Sep. 1, 1990, pp. 287-296 (10 pages).

(Continued)

*Primary Examiner* — Cassie Galt
(74) *Attorney, Agent, or Firm* — Klein, O'Neil & Singh, LLP

(57) ABSTRACT

The present disclosure relates to a monitoring system which comprises at least one monitoring satellite placed in orbit at a lower altitude than that of the satellites of the satellite constellation so as to be capable of receiving the positioning signals emitted towards the Earth by said satellites, and which comprises a processing unit intended for verifying the integrity of said received positioning signals, using position information that is separate from said signals for this purpose.

19 Claims, 3 Drawing Sheets

(56) References Cited

OTHER PUBLICATIONS

Caporicci et al. "GPS Integrity Monitoring and System Improvement with Ground Station and Multistationary Satellite Support", 500 Years After Columbus—Navigation Challenges of Tomorrow. Monterey, CA, Mar. 23-27, 1992, Proceedings of the Position Location and Navigation Symposium (Plans), New York, IEEE, US, ISBN: 978-0-7803-0468-0, pp. 559-565 (8 pages).

* cited by examiner

SYSTEM FOR MONITORING A SATELLITE CONSTELLATION OF A POSITIONING SYSTEM

CROSS-REFERENCE TO RELATED APPLICATION(S)

This is a national phase application under 35 U.S.C. §371 of PCT Application No. PCT/FR2009/052107, filed Nov. 2, 2009, which claims the benefit of French application No. 08/06162 filed Nov. 5, 2008, the contents of which are expressly incorporated herein by reference.

FIELD OF ART

The present disclosure relates to a system for monitoring a satellite constellation.

More particularly, it relates to checking positioning signals coming from (positioning) satellites of a usual satellite positioning system, for example of the GALILEO, GPS or GLO-NASS type.

BACKGROUND

As known, satellite positioning systems comprise a constellation of satellites being arranged on average altitude orbits (of the order of 25,000 km) around the Earth. Such satellites and the orbits thereof are generally referred to in the art as "MEO satellites" and "MEO orbits", respectively (for "Medium Earth Orbit"). The MEO satellites are evenly distributed in several orbit planes, so that, in any point of the Earth, a user is able to see several MEO satellites, that is being directly connected to them (at least three, but four if the user wants to know his altitude) and deduce therefrom his own earth coordinates. Each MEO satellite carries a high stability and accuracy atomic clock, as well as an electronic equipment sending to users positioning signals comprising the corrected time (brought back to a common reference) and the ephemerides of the satellite. From such positioning signals received from several MEO satellites, the user determines his distance to the various visible satellites and therefore deduces therefrom his position in earth coordinates. The present method, system and device aims at checking the integrity of such positioning signals.

It is known that usual solutions uses earth stations being dedicated therefor. Such stationary stations permanently compare the information received from satellites (via positioning signals) their accurately known effective position, so as to optionally detect a cohesion matching error in the received signals. Possible local deviations are transmitted to one or more control centres processing the information and identifying the satellite(s) transmitting erroneous positioning signals. Such quality information from the received positioning signals are transmitted to users later on, so that they ignore the erroneous signals in their positioning calculation.

The error causes in the positioning, signals being received can be ranked in two large categories, that is:

common errors due to satellites. Such errors are mainly due to the drift of the on-board clock giving the time reference, to the drifts of orbit parameters of the satellites or to processing anomalies on-board the satellites; and local errors due to the propagation of signals through the atmosphere and/or to local multiple path phenomena. Such errors vary with time, simultaneously affect only a limited number of users, and are not of the direct responsibility of the operator who has no means for correcting them, as they depend on natural physical phenomena.

As the satellite positioning systems all use the measurement of differences of arrival time for the positioning signals emitted by satellites for calculating the earth position, and as both above mentioned error categories have an identical effect, that is, a time error of the signals received by the user, it is easy to confuse a local propagation error with a time error of the signal sent by satellites. In order to try and suppress such an ambiguity, dedicated processing centres collect information coming from numerous stations on the ground, and, through an essentially statistic calculation, separate the common error part from the local error part. Indeed, only the common error part, that is that coming from one or more satellites, is worth being transmitted to all users. Such a complex processing is time consuming, as it involves having to wait for enough information in order to distinguish without any ambiguity that part being local to one or more stations (such as an ionospheric effect or a geometry of the constellation leading to multiple paths) from the part being common to all stations and the cause of which can thus only be located on-board one or more satellites.

Until the positive identification of the erroneous satellite(s) is completed, all users will make an error in their positioning calculation, with potentially severe consequences, in particular, for mobile devices. It is easily understood that reducing the identification time of erroneous (satellite) positioning signals is a priority for any operator of such a positioning system, with a view to ensure the quality of his system to users.

SUMMARY

The present method, system and device aims at solving the above mentioned drawbacks. It relates to a monitoring system being intended for monitoring positioning signals emitted by a satellite constellation belonging to a positioning system, for example of the GPS, GALILEO or GLONASS type, and allowing to remedy the above mentioned drawbacks.

To this end, according to the present method, system and device, said monitoring system is remarkable in that it comprises:

at least one monitoring satellite being positioned in orbit at an altitude lower than that of the satellites of said satellite constellation so as to receive the positioning signals emitted by such satellites to the Earth, and comprising at least the following on-board means:

at least one receiver being able to directly receive positioning signals emitted by the satellites of said satellite constellation:

at least one processing unit being formed so as to check the integrity of said received positioning signals, using a positioning information being independent from these positioning signals, and to determine the case being the satellite(s) having emitted erroneous positioning signals; and at least one emitter being able to emit to the Earth integrity data indicating, the case being, the satellite(s) of said satellite constellation with erroneous positioning signals;

at least one control centre being arranged on the Earth, for controlling said monitoring satellite, determining the orbit thereof, and comprising means able to receive integrity data emitted by such a monitoring satellite; and at least one integrity message distributing centre being arranged on the Earth and comprising:

means for receiving integrity data from the monitoring satellite, being transmitted by said control centre;

means for determining, from such integrity data, integrity messages relating to satellites of said satellite constellation of the positioning system; and means for emitting such integrity messages to users.

Thus, thanks to the present method, system and device, instead of using stationary stations provided on the ground for monitoring the constellation of satellites of a positioning system, the monitoring system uses at least one monitoring satellite being located at an altitude lower than those of satellites of said satellite constellation so as to be able to receive the positioning signals emitted by the latter (and intended for the users of the positioning system), but being placed in orbit so as to prevent local errors from occurring such as described herein above, due, more specifically, to local multiple path phenomena or to propagation delays.

Consequently, a particularly reliable monitoring system is obtained, allowing, more specifically, to autonomously and rapidly detect, and without any ambiguity, the erroneous positioning signals emitted by one or more satellites of the positioning system being monitored, using, to this end, a positioning information being independent from said positioning signals.

In a preferred embodiment; said monitoring system comprises a plurality of monitoring satellites such as mentioned herein above, being all placed at lower orbits than the satellites of the constellation and implementing the above mentioned functions.

Advantageously, each monitoring satellite further comprises on-board auxiliary means, allowing to determine (with the help of information received from said control centre) a first position in the space of said monitoring satellite, without using said positioning signals emitted by satellites of the satellite constellation, and said processing unit comprises:

first means for calculating at least one second position, with the help of said positioning signals received from satellites of the satellite constellation;

second means for comparing therebetween said first and second positions; and third means for deducing therefrom, the case being, the existence of erroneous positioning signals.

Furthermore, in a preferred embodiment:

said first means are formed so as to calculate a plurality of second positions, each one of said second positions being calculated using the positioning signals received from a sub-group of satellites of said satellite constellation, each said sub-group comprising an identical first predetermined number of satellites (for example four satellites) and two any sub-groups having in common each time, at the most, one second predetermined number of satellites (for example two satellites);

said second means are formed so as to compare each one of these second positions to said first position; and said third means are formed so as to determine, the case being, the satellite(s) having its or their positioning signals being erroneous, with the help of the results of the comparisons implemented by said second means and the composition of said sub-groups.

Furthermore, each monitoring satellite additionally comprises a single receiving antenna being associated with said receiver, being positioned so as to avoid multiples paths, and being surrounded with one electromagnetic protective screen for removing unwanted propagation modes (through reflection or diffraction of the positioning signals on the structure of said monitoring satellite), allowing to remove the most frequent phenomena able to disturb the reception of signals by the antenna.

In a preferred embodiment, said monitoring satellite(s) is or are placed at orbits:

having higher altitudes than those of the dense layers of the ionosphere, allowing to avoid ionospheric delays from occurring resulting from positioning signals passing through the dense layers of the ionosphere; and/or having a plane different from the planes of the orbits of said satellites of the satellite constellation, so as to maximize the error detection accuracy.

Furthermore, in a preferred embodiment, said control and distribution centres are located at the same place and belong to one single same management centre.

Additionally, advantageously, said control centre further comprises:

means for remotely controlling each one of said monitoring satellites; and means for calculating orbit parameters of said satellite(s) for monitoring and updating processing units on-board such monitoring satellite(s).

Furthermore, advantageously, said distribution centre further comprises coding means for coding integrity messages before they are emitted so as to restrict using such information to particular customers (having for example subscribed a contract) provided with appropriate decoding means.

BRIEF DESCRIPTION OF THE FIGURES

The figures of the appended drawing will better explain how the present method, system and device can be implemented. In these FIGS., like reference numerals relate to like components.

DETAILED DESCRIPTION

Figure 1:
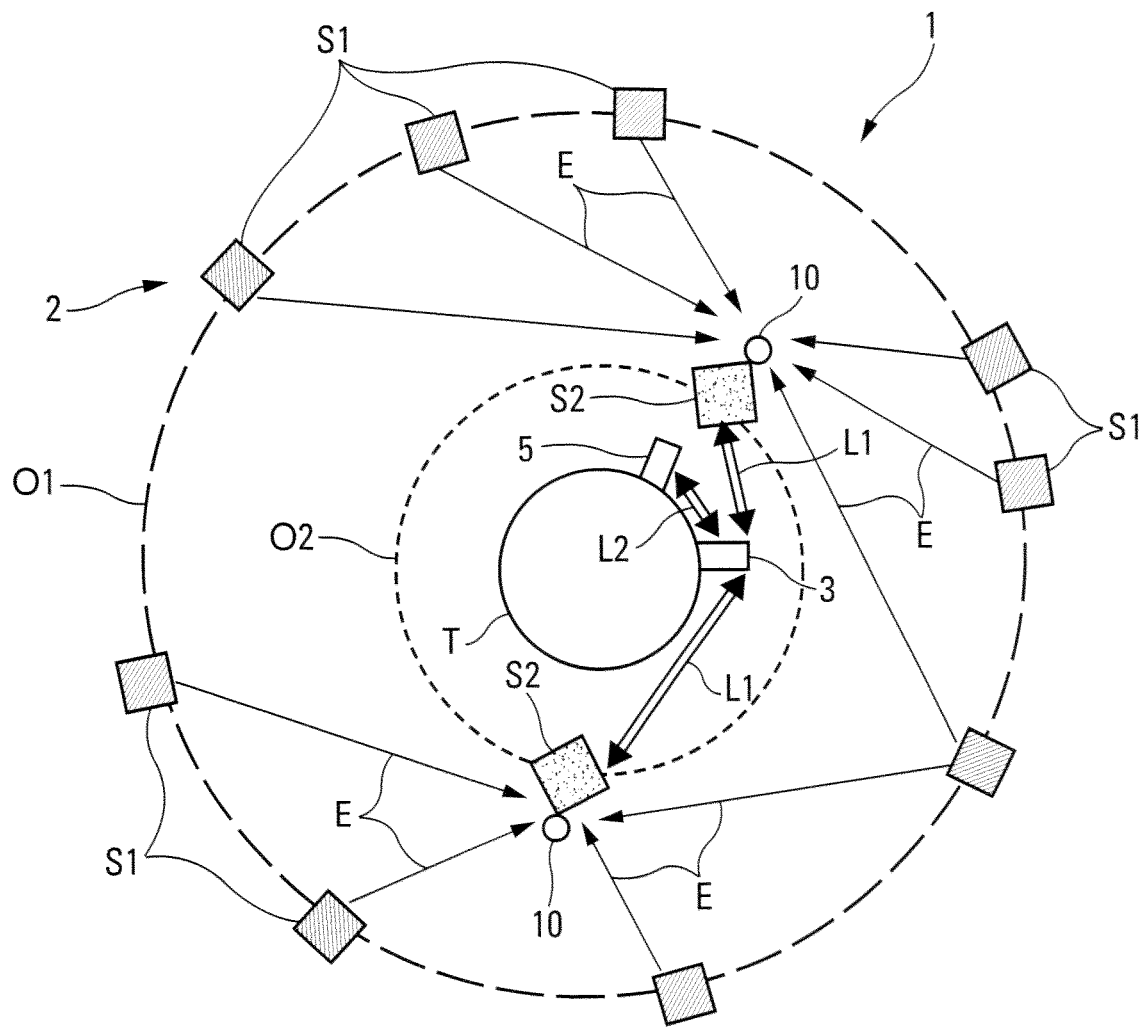
FIG. 1 schematically illustrates the architecture of a monitoring system according to the present method, system and device.

The monitoring system 1 according to the present method, system and device and shown according to a schematic architecture on FIG. 1 is intended for monitoring a usual satellite positioning system, for example of the GALILEO, GPS or GLONASS type as well as the increasing satellites such as EGNOSS.

FIG. 1 merely represents a satellite constellation 2 of such a positioning system. Such a satellite constellation 2 comprises a plurality of satellites S1 being placed in orbit around the Earth T at an orbit 01, generally, having an average altitude (of the order of 20,000 to 25,000 km).

The monitoring system 1 according to the present method, system and device more particularly aims at monitoring the positioning signals emitted by the satellites S1 of such a satellite constellation 2 of the positioning system. It is usually known that such positioning signals are used by users of the positioning system so as to determine more specifically their position, and optionally, their speed.

Figure 5:
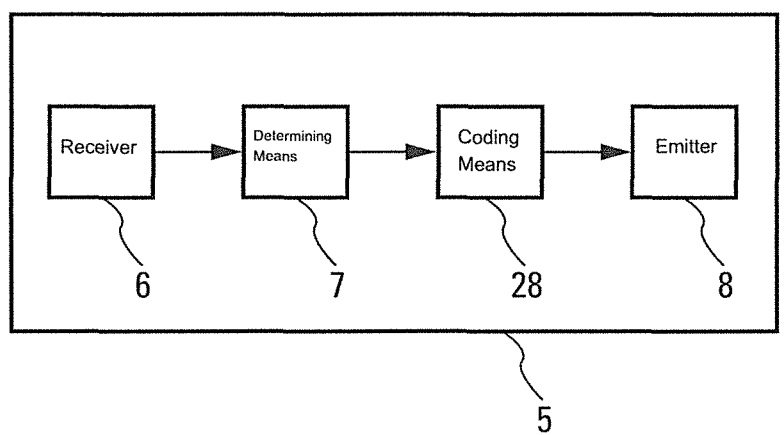

According to the present method, system and device, said monitoring system 1 comprises to this end:

at least one, but preferably a plurality of monitoring satellites S2. Such monitoring satellites S2 are placed in orbit around the Earth T, at an orbit 02 having an altitude, for example ranging from 2,000 to 3.000 meters, being lower than that (of the order of 20,000 to 25,000 meters) of the satellites S1 of said satellite constellation 2 so as to receive, as shown by the arrows E, the positioning signals emitted by a large number of satellites S1 to the Earth T;

at least one control centre 3 being arranged on the Earth T, controlling said monitoring satellites S2, and comprising means 4 able to receive integrity data emitted by such monitoring satellites S2. The data transmission links L1 between the control centre 3 and the monitoring satellites S2 are of a usual type, based on electromagnetic waves; and at least one integrity message distribution centre 5 being arranged on the Earth T and comprising, as shown on FIG. 5:

means 6 for receiving the integrity data emitted by said monitoring satellites S2 and transmitted by said control centre 3;

means 7 for determining, from such integrity data, integrity messages relating to satellites S1 of said satellite constellation 2 of the positioning system. Such integrity messages clearly identify, the case being, the satellite(s) S2 emitting erroneous positioning signals; and means 8 for emitting such integrity messages to users.

The users of the positioning system could then ignore the positioning signals received by the satellites S1 identified in an integrity message and only use the integer satellite signals S1.

Figure 2:
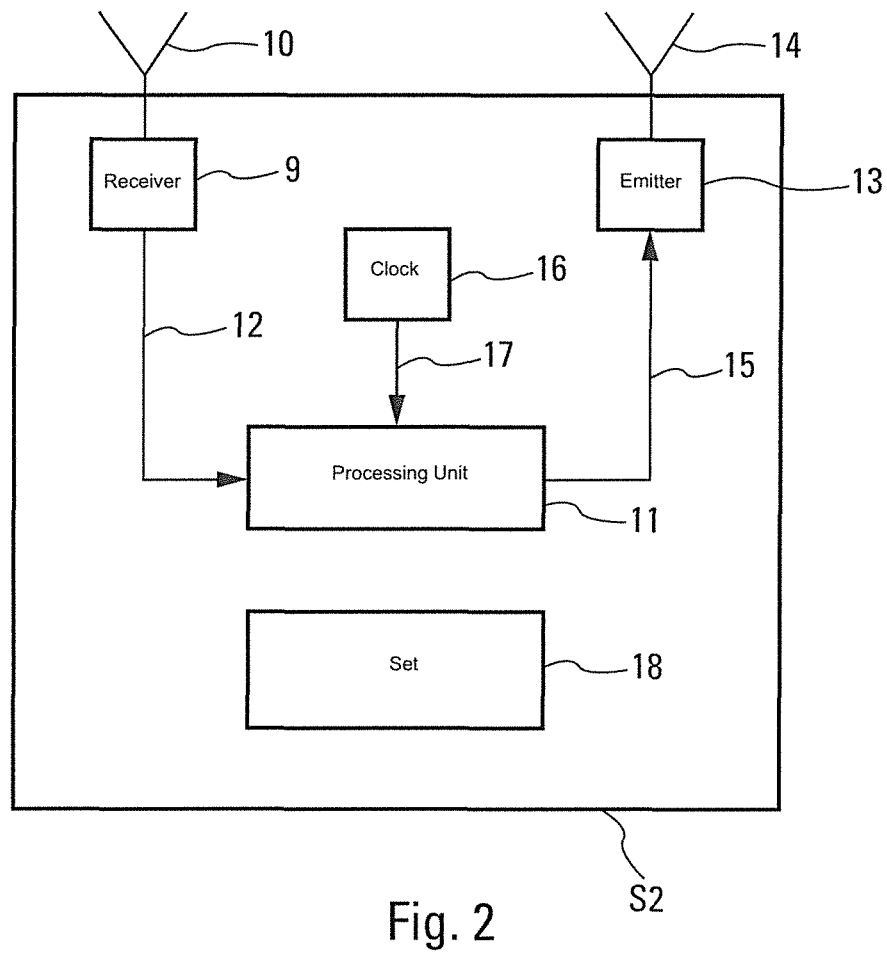
FIG. 2 schematically shows the main means being on-board a monitoring satellite belonging to a monitoring system according to the present method, system and device.

In addition, according to the present method, system and device, each one of the monitoring satellites S2 of the system 1 comprises at least the following on-board means, as shown on FIG. 2:

at least one receiver 9 being able to receive, through an associated antenna 10, the positioning signals emitted by satellites S1 of said satellite constellation 2;

at least one processing unit 11 being formed so as to check the integrity of said positioning signals received via a link 12, using a position information (to be described below) being independent from such positioning signals. Additionally, such a processing unit 11 is formed so as to determine, the case being, the satellite(s) S1 having emitted erroneous positioning signals; and at least one emitter 13 being able to emit to the Earth T, as shown by the link L1, with the help of an associated antenna 14, integrity data received (via a link 15) from the processing unit 11 and indicating, the case being, the satellite(s) S1 of said satellite constellation 2, the positioning signals of which are erroneous.

The monitoring system 1 is thus able to independently check the integrity of the positioning system being monitored, being able to broadcast information regarding the quality of the positioning signals emitted by the satellites S1 to, more specifically, users of said positioning system.

The interest of using monitoring satellites S2, instead of stationary earth stations more specifically is that the positioning signals received from such monitoring satellites S2 are free of any local errors such as multiple paths for example. Through monitoring satellites S2 of this type, the monitoring system 1 is thus able to perform a quick autonomous detection with no ambiguity of the erroneous positioning signals emitted by one or more satellites S1 of the satellite constellation 2 of the positioning system.

In a particular embodiment, said monitoring satellites S2 are placed at orbits 02:

having higher altitudes than those of the dense layers of the ionosphere, allowing to avoid ionospheric delays from occurring resulting from positioning signals passing through the dense layers of the ionosphere; and/or having a plane different from those of orbits 02 of said satellites S1, so as to maximize the error detection accuracy.

Additionally, in a preferred embodiment, each monitoring satellite S2 has on-board the following equipments shown on FIG. 2, some of which were previously mentioned:

the receiving antenna 10 for positioning signals. Such an antenna 10 is positioned so that there is no possibility of multiple paths through reflection or diffraction of the positioning signals on the structure of the monitoring satellite S2. To this end, such an antenna 10 could also be provided, if need be, of a usual electromagnetic protective screen (not shown) being intended for removing unwanted propagation modes and surrounding such an antenna 10;

one or more receivers 9 giving the position of the antenna 10 of the monitoring satellite S2 with respect to the satellite constellation 2 of the positioning system, as well as time information;

a good stability clock 16, providing a time reference independent from the satellite constellation 2;

one or more processing units 11 for processing the information transmitted by the on-board receivers 9 and clock 16 (via the links 12 and 17) and being formed so as to detect whether one or more positioning satellites S1 send erroneous positioning signals, as described below;

the emitter 13 and its antenna 14, operating at a different frequency from that of the positioning signals and transmitting the processing results implemented by the processing unit(s) 11; and a set 18 of usual elements and functionalities of any satellite, being more specifically intended for:

piloting the altitude and correcting the orbit 02 of the monitoring satellite S2;

supplying the required electric power; and providing a reasonable thermal environment for the on-board equipment.

Figure 3:
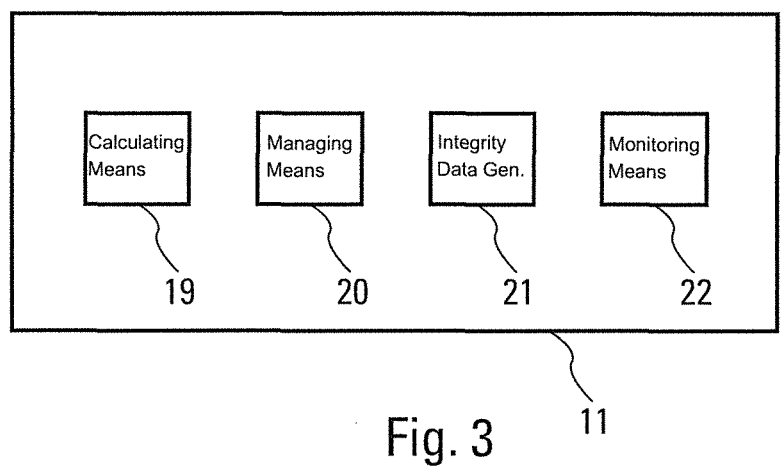
FIG. 3 is the block diagram of a processing unit for a monitoring satellite according to the present method, system and device.

Within the scope of the present method, system and device, the on-board processing unit(s) 11 on the monitoring satellites S2 carry out the management operations for the satellites S2, as well as operations specific to the monitoring mission. In particular, in order to perform the latter operations, an on-board processing unit 11 comprises the following means, shown on FIG. 3:

means 19 for calculating the three dimension position and the speed of the satellite S1 to be monitored, from the positioning signals received from the satellite constellation 2. Such signals are used in evenly distributed sub-groups. Each sub-group comprises a given number of satellites, for example four satellites, no more than a given number thereof (for example two) being common to two sub-groups;

means 20 for managing the propagation of orbit parameters of the satellite and of time on-board. Such parameters are initially loaded from the control centre 3;

means 21 for generating integrity data identifying, the case being, the satellite(s) S1, the positioning signals of which are erroneous. Such integrity data are to be transmitted to the control centre 3 and to users of the positioning system; and means 22 for monitoring the operating state of the monitoring satellite S2 and in particular, the consistency between the three dimension position being calculated and that propagated on-board, so as to be able to detect an anomaly of the on-board payload.

To this end, a characteristic property of the monitoring satellite S2 could be used, wherein there could not exist several true three dimension positions for one single satellite S2, as the latter only comprises a single receiving antenna 10. Such a condition is met with even more accuracy as the centre of gravity of the monitoring satellite S2 is close to the position of the receiving antenna 10, such a condition being met for a small satellite with a size typically lower than one meter, and the altitude of which is known to within a few degrees. In the case where the satellite S2 has a larger distance between its centre of gravity and its receiving antenna 10, the means 22 could comprise calculation means for performing a correction as a function of the altitude of the satellite S2, in order to maintain the consistency between the estimated position of the centre of gravity being on the orbit 02 and the position of the receiving antenna 10 supplying the calculated three dimension position.

Moreover, according to the present method, system and device, said means 19 compare the calculated 3D position for each sub-group to an independent position estimated from orbit parameters of the monitoring satellite S2, received from said control centre 3, so as to determine whether there is a deviation (higher than a predetermined value). In case of no significant deviation, the processing unit 11 comes to the conclusion that:

on the one hand, the independent position, calculated using orbit parameters, is correct; and on the other hand, the positioning signals emitted by the satellites of the sub-group being considered are all reliable, as it is statistically impossible in such a situation to be in the presence of two compensating errors.

In compensation, should a significant deviation be detected, said means 19 carry out a regressive calculation for determining which satellite(s) S1 transmit(s) erroneous signals. The calculation principle is that, if one of the sub-groups shows a significant deviation with respect to the estimated independent position, such a sub-group contains at least one satellite S1 with erroneous positioning signals. Thus, carrying out a series of changes of satellites S1 of such a sub-group with those of other sub-groups, said means 19 are able to rapidly isolate the satellite(s) S1 being at the origin of the detected error(s).

In a simplified (not shown) embodiment, the control centre 3 and the distribution centre 5 are located at the same location on the Earth T and belong to one single same management centre.

Figure 4:
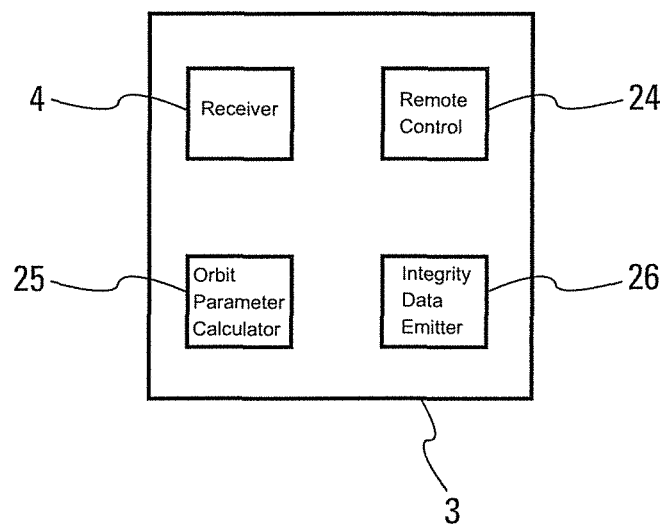
FIGS. 4 and 5 schematically show the main means respectively of a control centre and a distribution centre.

Said control centre 3, particularly, comprises as shown on FIG. 4:

said means 4 for receiving integrity data emitted by the monitoring satellites S2;

means 24 for remotely controlling said monitoring satellites S2 via the link S1;

means 25 for calculating orbit parameters of said monitoring satellites S2 and for updating processing units 11 on-board such monitoring satellites S2; and means 26 for emitting integrity data to the distribution centre 5, as illustrated by a link L2 on FIG. 1.

Said distribution centre 5 further comprises, in addition to the above mentioned means 6, 7 and 8, coding means 28 for coding the integrity messages (generated by the means 7) before they are emitted (with the means 8) to users, so that only authorized users or having paid a fee are able to decode the integrity information. The distribution of decipher keys could be carried out through usual secured means. Sending integrity information (to users) could occur as follows:

via Internet; or via radioelectric waves; or via existing means or specific means (radio or television communication satellites, EGNOSS, etc.).

The invention claimed is:

1. A monitoring system for monitoring positioning signals emitted by a satellite constellation belonging to a positioning system, said monitoring system comprising:

at least one monitoring satellite comprising the following:

at least one receiver being able to directly receive positioning signals emitted by satellites of said satellite constellation; and at least one emitter being able to emit to the Earth, integrity data indicating, which satellites of the satellite constellation are emitting an erroneous positioning signal;

at least one control center being arranged on the Earth, controlling the position of said at least one monitoring satellite and configured to receive integrity data emitted by such a monitoring satellite; and at least one integrity message distributing center being arranged on the Earth and comprising:

a receiver for receiving the integrity data from said at least one control center;

a processor for determining, from such integrity data, integrity messages relating to satellites of said satellite constellation of the positioning system; and a transmitter for emitting such integrity messages to users, wherein said at least one monitoring satellite is placed on orbit at an altitude lower than that of the satellites of said satellite constellation and higher than that of the dense layers of the ionosphere, and said monitoring satellite further comprises at least one processing unit configured to check the integrity of the received positioning signals, using positioning information independent from said positioning signals, to determine, which, if any, satellites of the satellite constellation are emitting erroneous positioning signals.

2. The monitoring system according to claim 1, further comprising a plurality of monitoring satellites.

3. The monitoring system according to claim 1, wherein the at least one monitoring satellite further comprises a second on-board processor configured to determine a first three dimensional position of said monitoring satellite, without using said positioning signals emitted by satellites of the satellite constellation, and said on-board processor configured to:

calculate at least one second position, with the help of said positioning signals received from satellites of the satellite constellation;

compare said first and second positions; and determine from the comparison, the existence of erroneous positioning signals.

4. The monitoring system according to claim 3, wherein the monitoring satellite is further configured to:

calculate a plurality of second positions, each one of said second positions being calculated with the help of positioning signals received from a sub-group of satellites of said satellite constellation, each one of said sub-groups comprising a predetermined number of satellites and any sub-groups having, at the most, a second predetermined number of satellites in common;

compare each one of these second positions to said first position; and determine, which, if any of the satellite's positioning signals are erroneous, using the results of the comparison and the composition of said sub-groups.

5. The monitoring system according to claim 1, wherein each monitoring satellite further comprises a single receiving antenna associated with said receiver, positioned on the satellite to avoid multiple paths, and surrounded with one electromagnetic protective screen configured to remove unwanted propagation modes.

6. The monitoring system according to claim 1, wherein each monitoring satellite is placed at an orbit having a different plane from those of the orbits of the satellites of said satellite constellation.

7. The monitoring system according to claim 1, wherein said control and distribution centers are co-located.

8. The monitoring system according to claim 1, wherein said at least one control center further comprises:
   a transmitter configured to send messages for remotely controlling each monitoring satellite and for updating the at least one processing units on-board each monitoring satellite; and
   a processor configured to calculate orbit parameters for each monitoring satellite.

9. The monitoring system according to claim 1, wherein said at least one integrity message distribution center further comprises a processor configured to code integrity messages before they are sent to users.

10. A method for eliminating local errors in a satellite monitoring system, said method comprising:
    placing at least one monitoring satellite comprising a receiver, a transmitter, and a plurality of processors at an orbit altitude higher than the dense layers of the ionosphere and lower than a satellite constellation in a positioning system to be monitored;
    providing a control center comprising a transmitter configured to send messages to the at least one monitoring satellite to control the at least one monitoring satellite's position, a second transmitter to send messages containing integrity data, and a receiver configured to receive integrity data emitted by the at least one monitoring satellite;
    providing at least one integrity message distributing center comprising a receiver for receiving the messages containing integrity data from said control center, a processor for determining, from such integrity data, integrity messages relating to satellites of said satellite constellation of the positioning system; and a transmitter for emitting such integrity messages to users; and
    wherein at least one of the plurality of processors on the at least one monitoring satellite is configured to organize the satellite constellation into a plurality of sub-groups of at least three satellites of the satellite constellation, to determine the at least one monitoring satellite's position from received signals from each sub-group of satellites, to compare the determined positions with positions determined independently of the received signals, to determine, based on the comparison, if any error is present in the received signals, to analyze at least one sub-group in order to determine which of the satellites in the sub-group is the source of the error, and to create a message containing information as to the error and as to which satellite in the satellite constellation is transmitting the error for transmission to the control center.

11. The method of claim 10, further comprising placing a plurality of monitoring satellites at an orbit altitude higher than the dense layers of the ionosphere, and lower than a constellation of satellites to be monitored.

12. The method of claim 10, wherein each sub-group of the plurality of sub-groups has one or more satellites that are common to at least one other sub-group or no common satellite in any sub-group.

13. The method of claim 10, wherein the at least one monitoring satellite further comprises an on board clock.

14. The method of claim 10, further comprising uploading orbital parameters from the control center to the at least one monitoring satellite.

15. The method of claim 10, wherein the at least one monitoring satellite further comprises an antenna configured to receive signals from the satellite constellation.

16. The method of claim 15, wherein the antenna is positioned on the at least one monitoring satellite to avoid receiving signals affected by multiple paths, and proximate the center of gravity of the at least one monitoring satellite.

17. The method of claim 11, wherein none of the monitoring satellites are placed in the same plane as any of the satellites of the satellite constellation.

18. A satellite monitoring system comprising:
    at least one monitoring satellite placed in space at an altitude below a satellite constellation to maximize a number of individual satellites of the satellite constellation that the at least one monitoring satellite can detect;
    a control center for receiving signals from the at least one monitoring satellite;
    an integrity message distribution center for broadcasting integrity messages;
    a receiver configured to receive and process positioning messages from satellites in the satellite constellation and integrity messages from the integrity message distribution center;
    wherein the at least one monitoring satellite comprises a processor configured to organize the satellite constellation into a plurality of sub-groups of at least three individual satellites, to determine the at least one monitoring satellite's position from received signals from each sub-group of satellites, to compare the determined positions with positions determined independently of the received signals, to determine, based on the comparison, if any error is present in the received signals, to analyze at least one sub-group in order to determine which of the satellites in the sub-group is the source of the error, and to create a message containing information as to the error and as to which satellite in the satellite constellation is transmitting the error for transmission to the control center.

19. The system of claim 18, wherein the monitoring satellite is placed at an orbit altitude above the dense ionosphere.

* * * * *